Dec. 13, 1932.  E. A. BRINER  1,890,932
VARIABLE PITCH PROPELLER
Original Filed Jan. 6, 1928  2 Sheets-Sheet 1
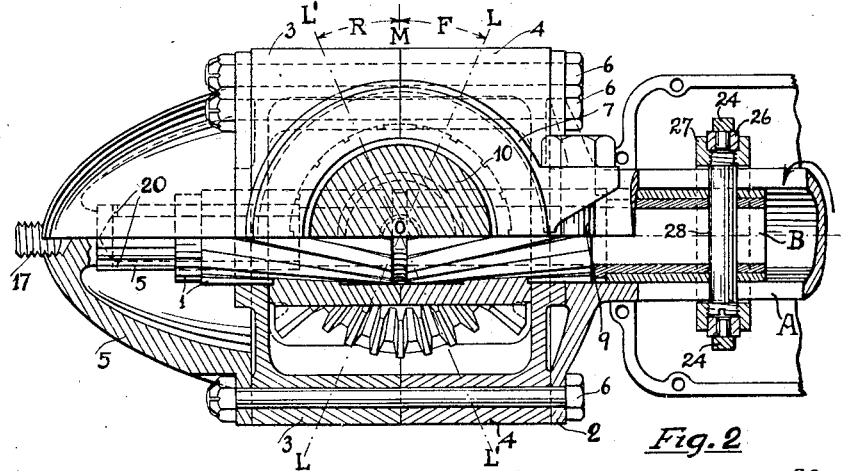
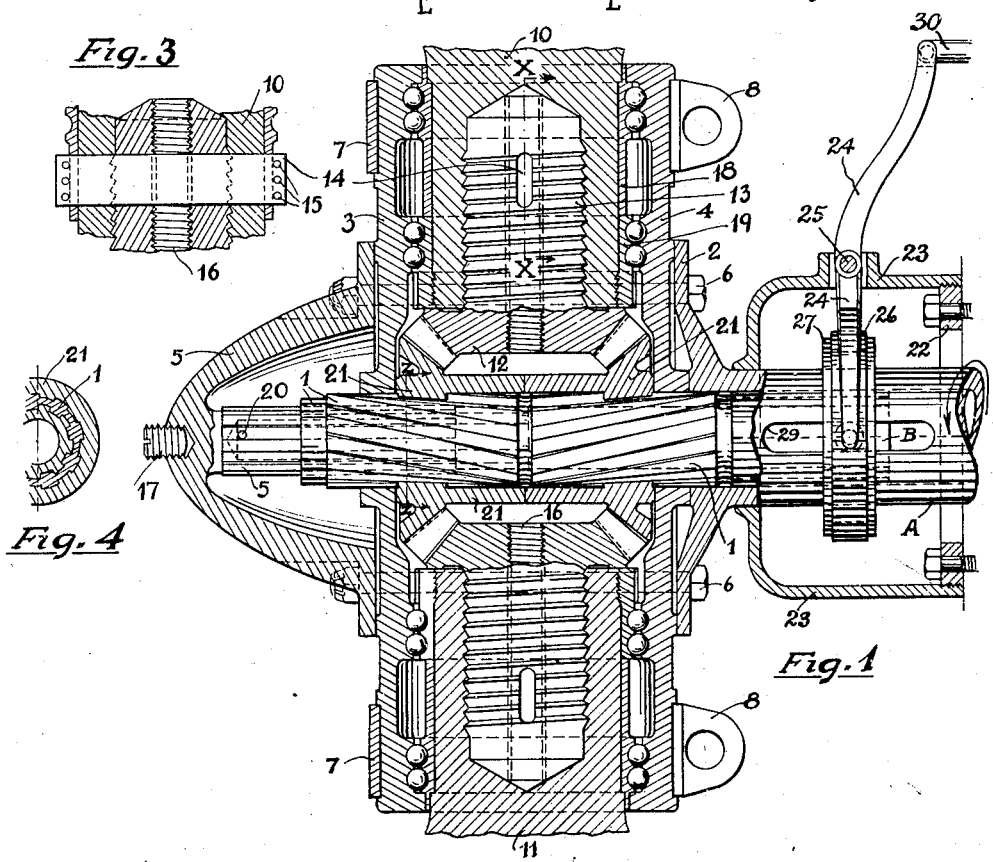
Witness
Martin S. Mansson
Inventor
Emil A. Briner

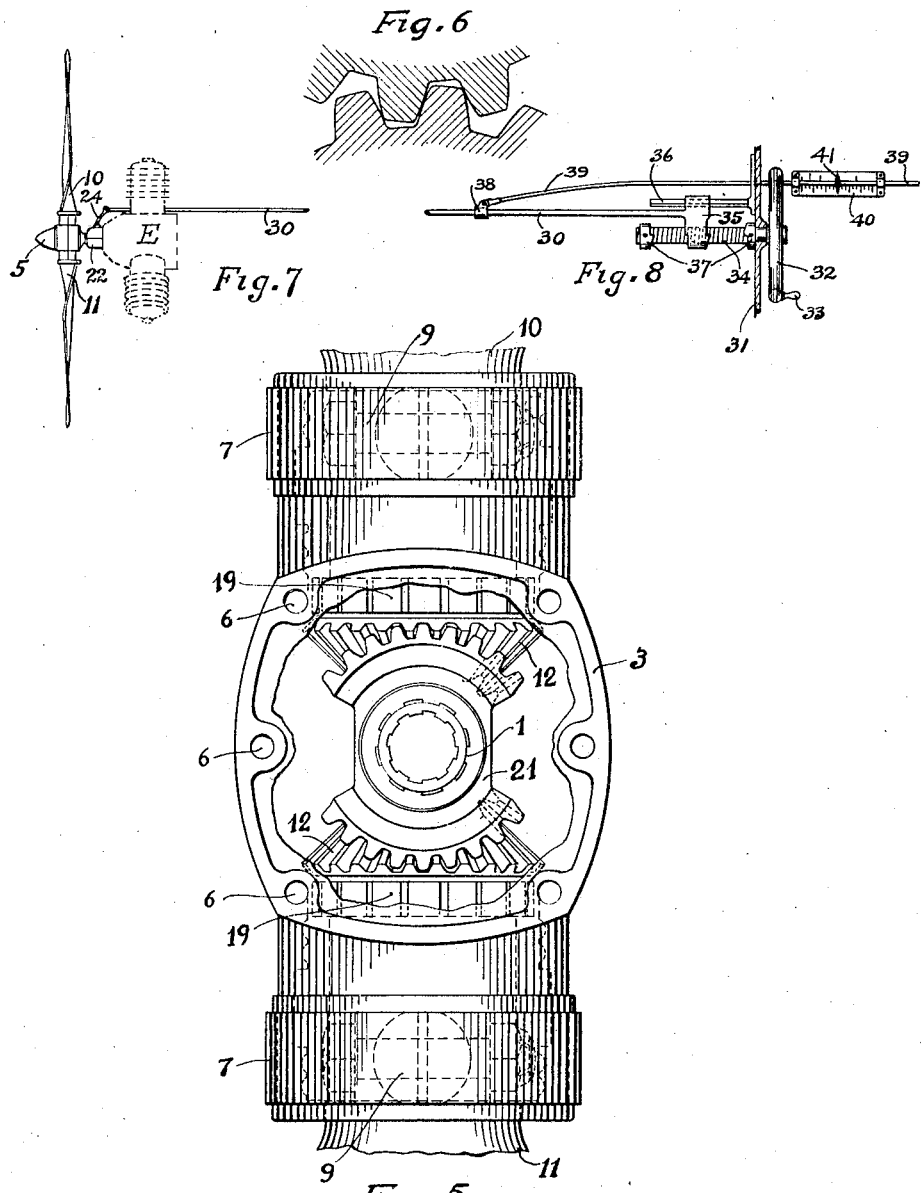

Patented Dec. 13, 1932

1,890,932

UNITED STATES PATENT OFFICE

EMIL A. BRINER, OF EAST ORANGE, NEW JERSEY

VARIABLE PITCH PROPELLER

Original application filed January 6, 1928, Serial No. 244,829. Divided and this application filed April 26, 1929. Serial No. 358,387.

This is a division of my application, Serial Number 244,829, filed Jan. 6th, 1928, for aircraft and method of flight.

The object of my invention is, not merely, to provide a propeller of such a construction as to permit angularly controlling the pitch of the blades, by rotating the blades about their own axis. That, in itself, has been done.

My object is to provide a construction that is more than a mere picture of something that can be manufactured and be made to work experimentally, and then quickly wear out in actual commercial service. That also has been done. Such can hardly be said to be useful inventions.

My object is more than that. It is to provide a construction, and mode of operation, so simple as to stand up under the actual, difficult conditions of service. Such conditions include the high revolutions required by commercial airplane engines, and the severe vibration of the engine and its mounting. Then there is a tuning fork, and twisting effect, called "flutter", incident to actual use. All these conditions must be met with maximum simplicity to keep down the first cost, weight, and maintenance expense.

As the airplane engine ordinarily has no flywheel, an object is to so dispose the material of the hub, that its weight and rigidity serve to smooth out the irregular turning moment of the engine. This reduces vibration in the airplane and engine, and partially dampens its effect before it reaches the blade setting.

It is important to achieve these objects, and make it possible to shift the pitch, or even reverse the propeller; with small expenditure of effort and attention on the part of the operator. In airplanes, variable pitch propellers must be capable of shifting at high revolutions in flight so as not to lose altitude.

It is not merely a case of strength of material; but the construction must possess inherent strength. Loads like centrifugal loads, must be carried along members having substantially straight lines. Such inherent strength must be so great as to be not only sufficient; but strong to such a degree that the propeller hub, and all its parts, remain rigid and inflexible under severe strain, regardless of the drastic limitations of weight imposed by flight conditions. Maximum rigidity, and endurance, are qualities essential to the commercial success of the variable pitch airplane propeller. All mechanical motion in the shift mechanism should be accurate, compact, and inherently balanced to attain practical success. I particularly exclude as unworthy of engineering consideration any propeller without at least two distinct and separate bearings supporting the root of each blade.

An object of the invention is to correct a common structural weakness in aircraft propellers of having a driving shaft pass through, or into, the propeller blade casing.

To make the point clear about the difficult practical conditions of service, I will give the following practical example. In Army and Navy two-bladed propellers, 8'—9" in diameter, in actual use with approved air-cooled engines of 200 horse power @ 1800 revolutions per minute; the centrifugal force, tending to tear a sixteen pound blade out by the roots is 30,000 lbs. Such propellers have blades adjustable on the ground, firmly bolted in place, and made of Westinghouse micarta, a material lighter than duralumin. If the blades were made of duralumin (27 lbs. per blade), the blade root would require bearings that would permit shifting the pitch, when the centrifugal force is over 50,000 lbs. Now, 25 tons may be ten times more than the weight of the whole airplane. Other forces acting on the blades would add approximately 50 percent, to the stresses imposed by the centrifugal force in each case.

The example is cited from a class of so called "adjustable pitch" propellers. The term, unfortunately, is partly a misnomer, since said pitch is only adjustable when the propeller is at rest. In operation, they perform precisely like solid non-adjustable propellers. They are more properly "sectional propellers" comprising hub and blades.

On the other hand, the "variable pitch" or "controllable pitch" class are adapted to changing the pitch in flight to meet the evolutions and operating conditions of aerial navigation. The National Advisory Committee for Aeronautics defines the terms "variable pitch" or "controllable pitch" as "turning the blades to any desired pitch, while the propeller is in rotation". Therefore, these terms must be so interpreted herein. Of course, the pitch of the blade may be changed incidentally, with the hub at rest,—zero revolutions.

A further object is to provide easy means for shifting the pitch of the blades; and yet, make the blades come near to without actually being self-locking within the blade casing in any position into which they may be moved. It is also important to indicate to the pilot the relative position of the propeller blades, and the approved function of each position as "take off", "climb", "economy" etc. to suit particular installations. Pilots are not generally familiar with these technical points.

The construction must be so simple that the number of parts approaches a minimum. The parts must also be compact so as to possess inherent strength. All cranks, levers, and arms must be eliminated from the revolving propeller. The bearings usually associated with levers, cranks, arms, etc. are comparatively small, consequently are much affected by wear and tear. Such levers, cranks, etc. promote and augment vibration. Two tenths of one degree variation in the pitch setting of the blades of a two-bladed propeller will often cause a serious vibration communicated to the airplane structure.

An important object of the invention is to so construct, arrange, and assemble the hub that no openings are needed therein for the passage of the power shaft, assembly of shift gears, blade adjusting arms, or other shift mechanism. The small reinforced openings at the axial center transmit no power from the power shaft. Attaining this object insures a hub of great inherent strength and stiffness per unit of weight.

Still another purpose is to totally enclose the pitch adjusting mechanism in a case that is forgeable, grease tight and water tight. This protects all that is good within the propeller, while keeping out all dust, dirt, rain, snow, or sleet.

In variable pitch propellers, it is sometimes important to vary the pitch setting down to zero; and then run into negative pitch angles, for the purpose of reversing the thrust of the propeller. This would occur, for example, in landing aircraft on the ground, or alighting on the water. Provision has been made in my design to limit the maximum pitch angle in the ahead position. Likewise, the pitch adjustment is stopped at some other pitch angle, when a minimum position is reached. Of course, it must be understood that the engine usually turns in one direction only; and that reversing the pitch angle of the propeller blades while the engine is running, effects reversal in propeller thrust.

It has been customary in designing aircraft propellers of the variable pitch type, to insert the end of the engine shaft right into the hub of the variable pitch propeller. This means transmitting the engine power through the centre of the propeller hub. I use a different method. My method is to transmit the engine power through flange bolts to the outside shell of the propeller casing, so as to obtain greater strength and stiffness; while leaving the core, or heart, of the propeller hub for the safe location of the smaller precision parts required for pitch adjustment. I eliminate engine twisting moment at the center of the hub casing, which is a weak spot when pierced by the engine shaft. In the sense that the power shaft does not pass through the propeller casing; my propeller may be regarded as hubless, affording a virtually stronger construction with a given weight, than can be obtained by passing the power shaft through the blade casing. Incidentally this sets the propeller blades farther from the engine, a position that adds a little to the overall efficiency of the propeller installation.

How important this is can be gathered from the following example. In present practice, a seven cylinder standard engine at full power transmits over 100 impulses (explosions) per second directly to the propeller, without the use of the usual flywheel to smooth out such explosive impulses. Pilots have referred to the effect as "giving her the gun", on account of its similarity to the sound at full throttle to the roar of a machine gun. At any rate, these impulses have to be taken care of without variation in the pitch setting and pitch controlling mechanism. Success or failure depends upon how well the variable pitch mechanism is able to stand such drastic punishment. Therefore, the shift mechanism is placed at the center of the blade casing, and all motions inside the propeller casing are accurately balanced one against the other. At the same time, the propeller housing must take care of other stresses; especially that of holding the blades together against that greatest stress of all, namely the centrifugal force tending to throw the blades apart.

The blades are made preferably of a material having a high strength per unit of weight. It is also feasible to use heavier material for the blades having a hollow form. This achieves the same purpose of strong, light construction of the blades. Different sizes of propellers will generally warrant different types and kinds of materials for the blade construction; where lightness, strength, and durability are all important factors. Many different kinds of material are now available for blades; so that the material, and type of construction of the blades, must be left largely to engineering judgment, dependent upon the conditions of service.

It is common practice at the present time for aircraft engines to weigh two pounds per brake horse power. A propeller is expected to absorb this power, and convert perhaps three-fourths of it into useful work, with a weight allowance of less than one-half pound per brake horse power.

The problem appears to be almost impossible of solution. Apparently no one has succeeded in producing an actual propeller capable of variable pitch, that can be said to be practical commercially. They are sometimes built, used a few times, and then laid aside.

In general, it is my object to overcome the aforesaid difficulties with a practical commercial construction.

My invention further comprises the details of construction, and arrangement hereinafter described, and claimed.

Referring to the accompanying sheets of explanatory drawings, the same reference letters in different views indicate identical parts.

Fig. 1 shows a two-bladed propeller sectioned on a line with the axis of a hollow power shaft, and in line with the axis of the blades. The power shaft is shown broken off at the right.

Fig. 2 shows a half-section on the line $mm$, Fig. 1; with a half plan view, having certain parts shown in section, other parts in full view, so as to illustrate the construction.

Fig. 3 is a section of the blade root on the line XX Fig. 1, showing how it is keyed to the gear, and to the inner race of the ball bearings.

Fig. 4 is a section through the gear and splined shaft on the line $zz$, Fig. 1.

Fig. 5 is a side view of Fig. 1 from the left, with the hub cap removed, and the hollow hub broken away, showing the working parts of the variable pitch mechanism.

Fig. 6 is a sectional detail showing the character of stub gear teeth, shown in Figs. 1, 2, and 5.

Fig. 7 shows an outside elevation of the variable pitch propeller, the actuating lever, control rod, etc., in general relation to an aircraft engine.

Fig. 8 is an enlarged detail of pitch control handwheel at a section of instrument board in the pilot's cockpit. A pitch indicator is connected by a flexible tube to the control rod, thus indicating the setting of the blades to the pilot.

In Figs. 1 and 2, the end of the power shaft A, spreads out into a flange connection. The internal rod B, which serves as a shifting rod for shifting the pitch of the propeller blades, has two cylindrical portions marked 1, provided with right hand, and left hand, spiral splines. These right and left splines may be called "herring bone splines" for technically describing the construction.

The power shaft A, has a flange 2. The propeller hub has a hollow form, made in two similar halves, 3 and 4. The hub halves are preferably made of heat treated steel with carburized ball races to secure special hardness integral with the hub. A streamline cap 5, has a base corresponding to flange 2, improving the contour, and providing a splined guide 5, for the shifting rod.

This cap has a series of six (6) fitted bolts marked 6, firmly bolting four connected parts together. In addition to the six bolts, the split hub is firmly held together by standard ring clamps 7, having lugs 8, and bolts 9.

In Figs. 1 and 2, only the sections of the broken-off cylindrical roots, or shanks, of the propeller blades, 10 and 11, are shown. This particular propeller has two blades, but three or more blades are also within the scope of the invention. The blades are made preferably of either a solid or a hollow construction, of the lightest material affording the maximum strength per unit of weight, so as to avoid shifting extra weight.

The blades may have any suitable external propeller, or airfoil, form with blade axis either straight radial, or curved slightly backward. It is desirable to have the blades fairly well balanced about their own axes, as regards air pressure in operation.

The round root of blade 10 in Fig. 1, is firmly attached to the gear 12, by a special threading 13, of a prolongation of the gear body. These are keyed together with a sleeve continuation of the ball bearing races by key 14, shown in side view, in Fig. 3. The keyway is cut at any proper blade position, and the key fitted into place. Finally, the key itself is made fast by the locking wires 15, as shown in Fig. 3.

A threaded axial hole 16, is provided for any convenient purpose like inserting a threaded plug to help balance the blades. Any minor temporary cause, that might unbalance the blades in service, could thus be easily corrected. The propeller cap 5, has a screw stud 17, for securing a stream-line spinner, or other fitting, to the cap by means of a nut.

The blade root is provided with two heat treated steel sleeves 18 and 19, each of which is grooved to serve as the inner races of two double-row ball bearings. The sleeve 18, is shown shrunk onto the blade root; but it may preferably be screwed on, to do its share of holding the blade. The sleeve 19, is grooved and threaded like a fluted nut for helping to hold the blade firmly within the propeller hub, so as to resist the great centrifugal force tending to throw the blades apart. The blade is held firmly by sleeves numbered 18 and 19, gear 12, and key 14.

The ball bearings are of a type adapted to take care of both the end thrust, tending to tear the blade out by the roots, and the side loads communicated by the shaft, and thrust forces, acting upon the propeller blades. It is noteworthy that I use four rows of balls for each blade, and really prefer these to be of somewhat larger proportions than are shown in Fig. 1, whenever it is possible to make them so. These ball bearings carry all the stresses incident to, and resultant upon, the propeller blades in action.

The use of two sets (two rows each) of such ball bearings on each blade, not only takes care of the centrifugal force, but also takes care of the reaction of severe cantilever bending loads on each blade.

The ball bearings serve to evenly distribute all these forces circumferentially, and eliminate friction. They serve a double purpose of holding the blades in the hub against centrifugal force, while they make it possible to shift the pitch of the blades with a minimum of effort.

The bevel gears shown inside the propeller in Figs. 1 and 5, are preferably made of a chrome-nickel steel, heat-treated to obtain toughness and wear. They reinforce the blade roots, and reinforce the holding power of the blade sleeves. However, gears marked 21, operating on the right and left hand splined rods, may be made of a tough manganese bronze, as being more readily manufactured of that material. High tensile bronze is an excellent material for absorbing shock coming from the teeth of the steel gears at the roots of the blades.

The cutting of the bevel gear teeth is important. These gears must be cut to an accurate fit. They must mesh closely together, see Fig. 6. There must be no "back-lash" or lost motion. Ordinary cut gears are given a certain amount of clearance. The teeth in my gears must mesh accurately into each other without any play. After being shifted, the gears serve to hold the blades in the established position regardless of the complex forces acting upon the blades. They do not serve to transmit power to the blades. They hold the blades in the correct position according to the pilot's setting.

The gears illustrated herein, Figs. 2 and 5, are what are known as straight bevel gears. They are the simplest to make. It is also possible to use what are known as spiral bevel gears. The teeth should preferably be of the "stub tooth" form approximately shown in Fig. 6. This form allows the gears to be meshed close together without the risk of jamming their action. The combination of hard steel gears in the blade roots, with a softer material such as bronze in the spline shaft gears, is desirable for practical accurate meshing.

In Fig. 1, the internal shifting rod B, with its spiral splined portions marked 1, always turns with the propeller hub and hollow power shaft A. The inside surface of the hollow end 1, is channeled to slide accurately upon a grooved projection on the inside of the propeller cap 5, see Fig. 4, showing a cross section on the line $zz$ in Fig. 1. The grooved projection compels the shifting rod B, to slide forward or back, in an accurate line parallel to the axis of hollow shaft A, when the pilot shifts the blades of the propeller. The grooved projection, and the pin in the shaft slot, guide the shifting rod B, at both ends against rotary movement relative to engine shaft and propeller. Holes 20, are drilled into the grooved projection inside the cap, to equalize any pressure difference in the connecting spaces while moving the shifting rod. No great importance is attached to the use of such holes.

One of the bevel gears 21, in Fig. 1, may also be seen in axial view in Fig. 5. The latter view shows clearly that a portion of each side of these gears has been cut away to save weight.

In Fig. 1, the hollow end portions 1, of the shifting rod have two external spiral cams (splines) cut upon them, one being a right, and the other a left hand spiral. Each cam consists of a series of eight or more spiral splines, that are more nearly axial in direction than circumferential. This herringbone arrangement of the spiral splines is self-balancing for holding the blades in position. For small spiral angles of the herring-bone splines, the mechanism is self-locking within the blade casing, independent of the hand wheel screw. This arrangement makes the cams easy to shift in an axial direction, when shifting the rod. The multiple series provide abundant wearing surface, and the maximum of strength; since ordinary keyways would soon wear out, and twist out, with severe stresses encountered in practice. This series of spiral cams engage corresponding spiral cams projecting inside the hubs of the two bevel gears 21, slidably mounted thereon, see Figs. 1 and 4. Shifting the guided rod B, compels the two bevel gears 21, to follow the spiral cams; thus turning said gears in balance accurately in opposite directions, and varying the pitch of the propeller blades. It is desirable to provide the smooth right end of the shifting rod 1, in Fig. 1, with a bronze sleeve to get one of the gears, 21, on the splines; or else spline the whole right end.

It should be noted in Figs. 1 and 2, that the hub halves, 3 and 4, are made in one piece, that their cross sections are unimpaired in strength throughout their length; and that the radial portions of such hubs are interconnected by substantially straight lines of the central portion. Such is the best means to withstand the enormous centrifugal force tending to throw the blades apart in operation.

As drawn in Figs. 1, 2 and 7, the propeller blades are shown in what is known as the neutral or mid-position, where their twisted surfaces cause no resultant axial thrust with power shaft turning. Such mid-position may be represented diagrammatically by the line OM in Fig. 2. With the power shaft turning as indicated by the arrow at the right of Figs. 1 and 2, and moving the shifting rod B to the right, I would throw the top blade of the propeller into the position LL, and the opposite blade into the position L'L'. These positions of the blade would represent the "ahead" position of a left hand propeller, causing an axial pull on the shaft toward the left in Figs. 1, 2, and 7.

Again, when the shifting rod B is moved to the left in Figs. 1 and 2, the top blade of the propeller would move into position L'L', and the opposite blade into the position LL Such would be the "reverse" position of a left hand propeller causing an axial thrust on the shaft toward the right in Figs. 1, 2 and 7.

It thus becomes apparent that by setting the position of the shifting rod B, I can cause the blades to assume any given pitch from full pitch ahead, through the neutral or midposition, to full pitch reverse.

In order to make explanation as simple as possible, the illustrations indicate a range of movement of approximately the same amount of pitch angle in the forward, as in the "reverse" position. In other words, in Fig. 2 the arc F equals the arc R. In actual practice, it is better to choose a neutral position so as to give perhaps twice as much pitch range in the "ahead" position as in the "reverse". In the "ahead" position, the pilot requires plenty of range for pitch adjustment. When flying at a high altitude in light air, with aircraft provided with a "supercharger" for compressing the air taken in by the carburettor, the pilot may increase the propeller pitch and the aircraft's speed without running the engine revolutions above the normal at sea level. By choosing small spiral angles for herring bone splines, the blade settings may be made all positive, for example plus 10 to 20 degrees. By choosing a spiral angle of about 10 degrees, it is possible to give a range of pitch adjustment to the blades from some negative setting, like minus ten degrees, to a plus setting of say twenty-five degrees. It is even possible to go beyond these points if necessary. In general, it is advisable not to provide more pitch range in either the "ahead" or "reverse" position than the service in individual aircraft requires. Small pitch ranges are preferred, because then it is easier to shift the pitch by using less spiral angle in herring bone splines.

Figs. 1 and 2, at the right, show a simple way of moving the shifting rod B, for which no particular claims in this specification are made.

For other improvements of this propeller, see applicant's co-pending application, Serial 476,096, Aug. 18th, 1930.

An adapter ring 22, is bolted to the engine housing. A lever box 23, in halves, is attached thereto. A forked lever 24, with fulcrum pin 25, operates a thrust ring 26, working on a sliding collar 27, having a cross-head pin 28, passing through slots 29, in hollow shaft A. This cross-head pin also passes tightly through the internal shifting rod B, but moves freely in slots 29, in the hollow shaft A. Thus when lever 24 is moved, it causes a corresponding axial movement of the internal shifting rod B, regardless of the turning of the power shaft. It is apparent that the internal shifting rod B, has a balanced motion in sliding; and yet is guided by the pin and slot, 29, at one end, and by the grooved projection, 5, at the other end. This is for stiffness, accuracy, and safety. A rod 30, pin connected to the end of forked lever 24, holds the lever in a fixed position, or communicates control movements from the pilot's cockpit. Of course, it is preferable to build the lever box 23, especially its lower half, in one piece with the engine crankcase, thus securing the greatest strength with a minimum of weight.

Fig. 7 illustrates the variable pitch propeller in a neutral position, mounted diagrammatically in front of an air-cooled engine E, indicated in dotted lines, with pitch control rod 30 broken, but its continuation to a larger scale is shown in Fig. 8. The rod 30 is expected to pass conveniently between any adjacent engine cylinders in actual practice.

Fig. 8 shows a sectional elevation of an instrument board 31, in the pilot's cockpit. A balanced handwheel 32, with handle 33, is keyed to a left hand screw 34, on the back of the instrument board. The pitch control rod 30 has a crosshead, 35, welded to it. This crosshead is threaded to suit the left hand screw 34, and slides over the square guide 36. When the pilot moves the handwheel clockwise, it moves the crosshead, 35, away from him. Such movement actuates the control rod 30, so as to increase the pitch of the left hand variable pitch propeller. Again, when the pilot moves the handwheel counter clockwise, he decreases the pitch, and may even reverse the pitch of the propeller. The hand wheel 32, may be turned by hand or power.

The two collars 37, in Fig. 8, are pinned to the handwheel screw 34. The collars are provided with jaws, which circumferentially meet corresponding jaws on the travelling crosshead 35, and stop its motion at either end without causing the screw mechanism to jam.

By this arrangement, definite stops are set in the hand control, limiting the setting of the pitch of the propeller blades in the "ahead" and "reverse" positions.

In Fig. 8 is shown a fitting 38, welded to the control rod 30, and having a pin connection with an eye on the end of a flexible tube 39. This flexible tube 39, passes through, and in front of, an indicator scale 40, in the pilot's cockpit. The flexible tube mounts a double index 41, reading on the indicator scale. The lower indicator scale may read blade pitch angles in degrees, or in feet of propeller pitch; while the upper scale might conveniently indicate corresponding "economy", "cruising", "full speed", "maximum pitch", "neutral" and "reverse". The indicator may be illuminated. It can be arranged so that a pilot could also feel the position of the index with his fingers, in the dark.

It must be evident from Fig. 8 and the construction of the variable pitch propeller, that the blade setting remains fixed when the pilot is not touching the handwheel 32. The handwheel needs attention only when shifting the propeller blades at will. The simple indicator, serving one purpose, and extremely light in weight, is of inestimable value to the pilot for instantaneous information, in operating both pitch and engine controls in flight.

There are certain advantages in a pitch control operating with a handwheel and screw. It gives a certain amount of slowness and accuracy to the control, particularly desirable in training planes, and for studying propeller performance in actual flight.

In accordance with the provisions of the patent statutes, I have described herein the general principle of construction, and operation, underlying my invention; together with one form of apparatus representative of its embodiment. I desire to have it understood that such form is only illustrative, and that the invention may be carried out by other means within the purview of the invention. Also, while it is desired to use the various features and elements in the combination and relations described; some of these may be altered and others omitted, without interfering with the more general results outlined; and the invention extends to such use.

Having described my invention, what I claim and desire to secure by Letters Patent is:

1. A variable pitch propeller, comprising a hollow power shaft, a hollow hub fixed to said shaft, axially rotatable propeller blades having their roots entered in said hub, ball-bearing means engaged between said hub and blade roots to sustain the centrifugal load on said blades and to reduce friction of axial rotation thereof, a shifting rod axially movable within said power shaft, separate counter balancing right and left spiral splines carried by said shifting rod, cooperating gears connected between respective blade roots and the right and left hand spiral splines respectively, and means for manually actuating said shifting rod.

2. In a controllable pitch propeller, the combination of an inclosing hub in two halves with axially rotatable propeller blades having roots inclosed by said hub, means including through bolts to secure said hub in swiveling relation to said blade roots, a plurality of spaced ball-bearing sets engaged between said hub and blade roots to sustain the centrifugal and bending loads on said blades and to reduce friction of axial rotative movements thereof, and means to impart swiveling movements to said blades with propeller in operation.

3. In a controllable pitch propeller, a radial hollow hub split longitudinally with the blade axes and adapted to be driven by a power shaft, axially rotatable propeller blades having roots entered in said hub, ball-bearing means engaged between races of said hub and blade sleeve races, reinforce rings and bolts to secure said hub assembled, concentric transmission means wholly within said hub and engaged with said blade roots for imparting adjusting axially rotative movement to said blades, and means for manually actuating said transmission means.

4. In a variable pitch propeller, the combination with a hollow hub having radial bearing portions, axially rotatable propeller blades having roots entered in said bearing portions, ball-bearing means engaged between the blade roots and said bearing portions, a driven bevel gear fixed to the inner end of each blade root, a pair of driving bevel gears within said hub to mesh respectively with opposite sides of said driven bevel gears, right and left hand multiple spiral splines engaged respectively with said respective driving bevel gears and axially slidable in relation thereto, a hollow power shaft connected with said hub, a shifting rod movable in said shaft for sliding said splines, and means for manually actuating said shifting rod.

5. In a variable pitch propeller, a hollow power shaft, a hollow hub adapted to be driven by said shaft, axially rotatable propeller blades having roots entered in said hub, counterbalanced transmission means centrally disposed within said hub for rotating said blades, said transmission means including a pair of multiple spiral right and left hand splines, a shifting rod to carry and move said splines, said shifting rod being axially slidable in said power shaft and hub, and means adjacent to said hub for moving said shifting rod.

6. In a variable pitch propeller, a hollow power shaft, a hollow hub adapted to be driven by said shaft, axially rotatable propeller blades having roots entered in said hub, counterbalanced transmission means centrally disposed within said hub for rotating said blades, said transmission means including a pair of multiple spiral right and left hand splines, a shifting rod to carry and move said splines, said shifting rod being axially slidable in said power shaft and hub, a cross-head pin connected with said shifting rod, said hollow shaft having slots through which said cross-head pin extends, and means exteriorly adjacent to said hub engaged with said cross-head pin for manually actuating said shifting rod.

7. In a variable pitch propeller, the combination with a power shaft of a hollow hub, means for fixedly coupling said hub to the free end of said shaft, said hub having radial bearing portions, axially rotatable propeller blades having roots journaled in said bearing portions, a shifting rod axially movable in said hub, said rod having herring-bone spiral splines, and bevel gearing actuated by said splines and connected with said blade roots for effecting pitch adjustments of said propeller blades.

8. In a controllable pitch propeller, an inclosing hollow hub in two halves having split radial bearing portions in the line of division thereof, an abutting power shaft, a flange face for fixedly coupling said hub to a flanged end of said shaft, through-bolts for securing said hub in assembled condition and to said shaft end, externally reinforcing rings to secure said bearing portions against separation, axially rotatable propeller blades having roots entered in said bearing portions, said bearing portions having internal annular ball races integrally formed therewith, opposing ball races affixed to said blade roots, and ball sets between opposed races.

9. In a variable pitch propeller provided with axially rotatable blades journaled in radial bearing portions of a hollow hub, a slidable shifting rod entered in said hub, an axially splined guide means for said rod, right and left hand spiral splines fixed on said rod, and bevel gearing actuated by said spiral splines to transmit axially rotative adjusting movement to said propeller blades.

10. In a variable pitch propeller, a hollow power shaft flange connected to a hollow hub having radial bearing portions, axially rotatable propeller blades journaled in said bearing portions, a plurality of sets of ball bearings engaged between said bearing portions and the journaled portions of each of said blades, said ball-bearing sets being adapted to sustain centrifugal thrust and rotational power stresses of said blades, and concentric blade pitch adjusting means axially disposed within said hub so as to rotate therewith.

11. A variable pitch propeller having in combination, a hollow hub having radial bearing portions, ball-bearings in said bearing portions, propeller blades having roots journaled by said ball-bearings and sustained thereby against centrifugal stresses, a nose cap affixed to the one side of said hub, a power shaft affixed to the other side of said hub, a shifting rod having three sets of splines comprising axial guide splines working in said nose cap, right hand spiral splines and left hand spiral splines, a pair of driving bevel gears respectively engaged by said right and left hand spiral splines, and driven gears fixed to said blade roots having meshed engagement at opposite sides with said driving gears.

12. In a variable pitch propeller, a split hollow hub having radial bearing portions in the line of division thereof, propeller blades having roots entered in said bearing portions, reinforcing sleeves fixedly secured to said blade roots, each sleeve having a plurality of axially spaced annular ball races, said bearing portions having annular ball races opposing said first mentioned races, anti-friction balls between opposed races, means for securing said hub and its bearing portions in assembled relation, bevel gears having axial projections threaded into the inner end portions of said blade roots, and a concentric transmission means axially disposed within said hub and cooperating with said bevel gears to impart pitch adjusting movement to said blades.

13. In a variable pitch propeller provided with axially rotatable blades journaled in radial bearing portions of a hollow hub, a slidable shifting rod entered centrally into said hub, an axially splined guide means for said rod, right and left hand spiral splines disposed externally on said rod, bevel gearing actuated by said spiral splines to transmit pitch adjusting movement to said blades, a hollow power shaft around the exteriorly extending portion of said shifting rod, means for securing said hub to the free end of said power shaft, said rod having a cross-head, said power shaft having longitudinal slots in its walls through which the ends of said cross-head project, a swivel ring means connected with said cross-head ends, actuating lever mechanism connected with said swivel ring means, and manually operable means for moving said lever mechanism.

14. In a controllable pitch aircraft propeller, a split hub member of rectangular box section in its central portion and of circular cross section in its radial portions, including split ball races swivelably mounting multiple blades in ball bearings, and having reinforced rings at each radial portion; said central portion forming two flange elements with registering bolts mating with a flange element of a power shaft: whereby said shaft is excluded from the hub, the blade roots are confined to a turning movement, a pitch setting mechanism is completely housed, and the power stress removed from the center of the hub.

In testimony whereof I affix my signature.

EMIL A. BRINER.